United States Patent [19]

Jenssen

[11] Patent Number: 4,599,727
[45] Date of Patent: Jul. 8, 1986

[54] STRONTIUM ALUMINUM FLUORIDE LASER

[75] Inventor: Hans P. Jenssen, Belmont, Mass.

[73] Assignee: Massachusetts Institute of Technology, Cambridge, Mass.

[21] Appl. No.: 665,014

[22] Filed: Oct. 26, 1984

[51] Int. Cl.$^4$ .............................................. H01S 3/16
[52] U.S. Cl. .................................................. 372/41
[58] Field of Search .................. 372/39, 41, 42, 68; 332/7.51

[56] References Cited

U.S. PATENT DOCUMENTS

| 3,397,316 | 8/1968 | Brown et al. | 372/41 |
| 3,405,371 | 10/1968 | Johnson et al. | 372/41 |
| 4,272,733 | 6/1981 | Walling et al. | 372/41 |

OTHER PUBLICATIONS

Kaminskii et al., "Investigation of the Stimulated Emission from $Sr_2V_5F_{19}$ Crystals Doped with $Nd^{3+}$ Ions", *Sov. J. Quantum Electronics*, vol. 4, No. 1, Jul. 1974, pp. 112–113.

Bagdasonov et al., "Stimulated Emission of $Nd^{3+}$ Ions . . .", *Soviet Physics*, vol. 19, No. 6, Dec. 1974, p. 350.

*Primary Examiner*—William L. Sikes
*Assistant Examiner*—Robert E. Wise
*Attorney, Agent, or Firm*—Kenway & Jenney

[57] ABSTRACT

A solid state laser whose medium is a strontium aluminum fluoride crystal doped with chromium. This laser medium has a wavelength tuning range centered around 850 nm and the laser gain is estimated to be a factor of 2–3 times higher than that of emerald and alexandrite lasers at room temperature.

7 Claims, 3 Drawing Figures

STRONTIUM ALUMINUM FLUORIDE LASER

BACKGROUND OF THE INVENTION

This invention relates to lasers and more particularly, to a solid state laser whose laser medium is a strontium aluminum fluoride crystal doped with chromium, $SrAlF_5:Cr^{3+}$. A number of solids have been found to be suitable for laser action. Generally, the laser active materials involve a rare earth, actinide, or transition metal dopant in a crystalline or glass host. Laser action has been demonstrated in alexandrite ($BeAl_2O_4:Cr^{3+}$), a naturally occurring mineral having the chrysoberyl structure. Laser action has also been demonstrated in a single crystal of emerald ($Be_3Al_2(SiO_3)_6:Cr^{3+}$). Both alexandrite and emerald lasers have a tuning range centered around 750 nm.

It is very desirable to have a solid state laser medium having a tuning range centered around 850 nm, that is, a shift of 100 nm toward the infrared as compared to an emerald or alexandrite lasing medium. A solid state laser having a wavelength tuning range centered around 850 nm will be extremely useful as a tunable source in spectroscopic scientific research. Such a solid state laser would be a replacement for liquid dye lasers which are unstable, hard to work with and messy. In addition, because second harmonic generation of 850 nm is in the blue portion of the spectrum, a laser operable in this region would be useful for communicating through water since light in this portion of the spectrum propagates efficiently through water. It is also desirable to have a solid state laser medium which not only has a wavelength tuning range centered around 850 nm, but also has a laser gain of 2–3 times higher than for emerald or alexandrite at room temperature.

It is therefore an object of this invention to provide a solid state laser including a laser medium whose tuning range is centered around 850 nm.

A further object of the invention is a solid state laser medium having a laser gain 2–3 times higher than that for alexandrite and emerald.

Yet another object of the invention is such a laser medium which is substantially temperature insensitive at room temperature.

SUMMARY OF THE INVENTION

These and other objects of the invention are achieved in a laser including a laser medium of $SrAlF_5:Cr^{3+}$ along with the appropriate pumping apparatus for exciting this laser medium to emit coherent radiation. Generally, the laser disclosed herein has the strontium aluminum fluoride crystal disposed within an optical resonator adapted for maintaining laser oscillations.

BRIEF DESCRIPTION OF THE DRAWING

The invention disclosed herein will be understood better with reference to the drawing of which.

DESCRIPTION OF THE PREFERRED EMBODIMENT

A crystal of $SrAlF_5:Cr^{3+}$ is grown by the Czochralski process reported in Journal of Crystal Growth 15 (1972), p. 141. In particular, such a crystal has been grown at the Massachusetts Institute of Technology. The following example describes one procedure for growing the crystal, and it should be understood that other techniques for crystal growth may be employed in practicing the invention. In this example, strontium aluminum fluoride doped with trivalent chromium ($Cr^{3+}$) is formulated for crystal growth by reacting a mixture of $SrCO_3$ reagent, $Al_2O_3$ 99.99% pure (Baikowski crystal grade) and $(NH_4)_2Cr_2O_7$ reagent in flowing HF gas. During this process the temperature of the reactants is raised gradually to 1000° C. to carry out conversion to fluoride. The proportions used are 48 mols $SrCO_3$, 26 mols $Al_2O_3$, 0.26 mols $(NH_4)_2Cr_2O_7$, and an uncalibrated excess of HF.

Crystal growth is carried out in an Ar atmosphere using the Czochralski (crystal pulling) method. The seed, oriented in the 'c' direction, is suspended by Pt wire and spaced about 1 cm from the end of a water cooled stainless steel seed rod. Seeding and initial growth of the boule out to 1 cm diameter is done under operator control via a minicomputer system. Thence a closed loop, laser based diameter control system takes over expansion to the final diameter of 1.5 to 2 cm and growth of constant diameter to a length of 7.5 to 10 cm.

The orientation of the seed crystal determines the orientation of the crystal boule. Thus an a-axis seed would yield an a-axis boule. This orientation is preferable for laser rods where the natural birefringence of the crystal helps maintain an output beam of high quality.

The Cr concentration of the crystal can be from below one percent, for example, 0.5%, to a high of approximately ten percent. The actual concentration is determined by the particular laser configuration being used—slab laser, rod laser, high or low power.

The laser gain of the strontium aluminum fluoride crystal has been calculated from spectroscopic parameters to be a factor of 2–3 times higher than that of emerald and alexandrite lasers at room temperature. Furthermore, temperature dependence is expected to be negligible around room temperature.

Figure 1:
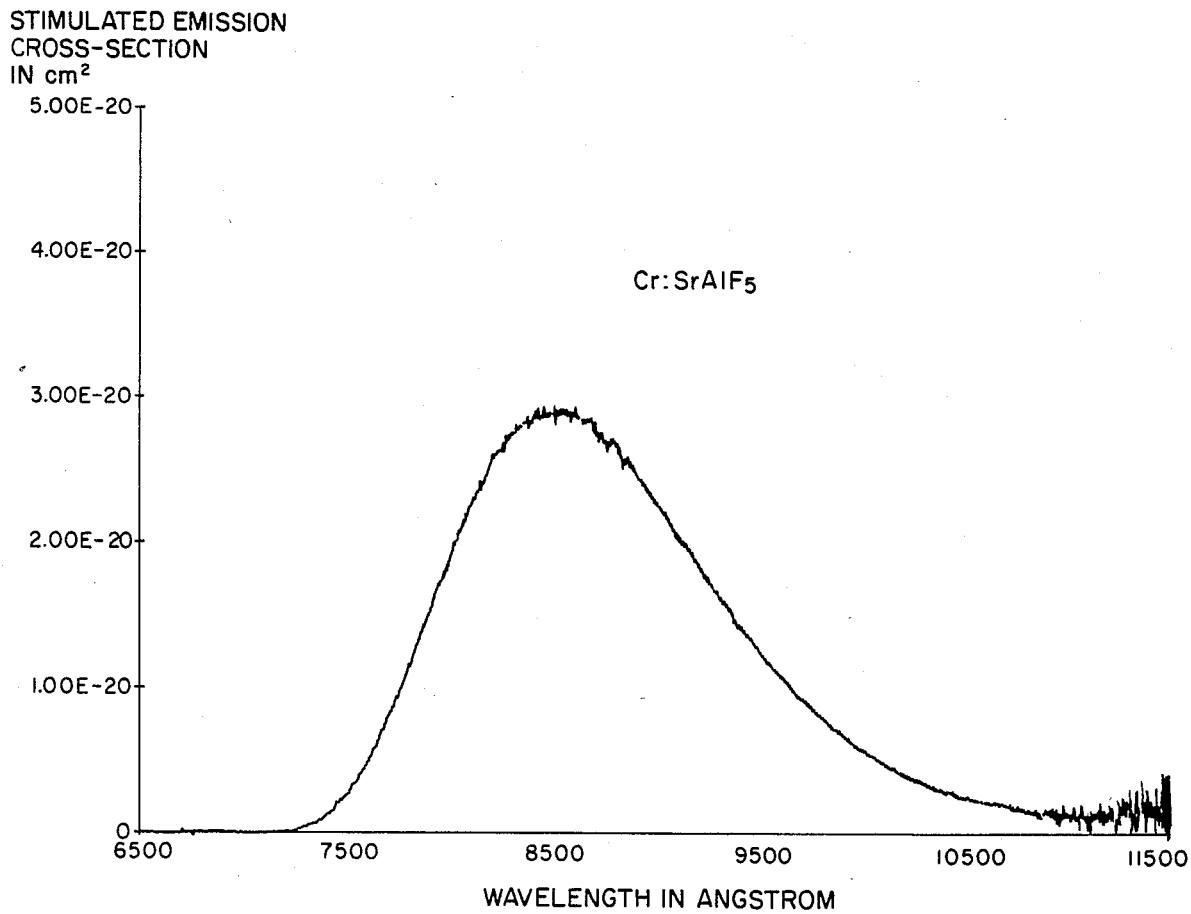
FIG. 1 is a graph showing the emission spectrum of a $SrAlF_5:Cr^{3+}$ crystal.

FIG. 1 shows the emission spectrum at room temperature for the $SrAlF_5:Cr^{3+}$ crystal. Note that the peak of the emission spectrum is centered around 850 nm. The useful operating wavelength region is between about 750 nm and up to 1,000 nm.

Figure 2:
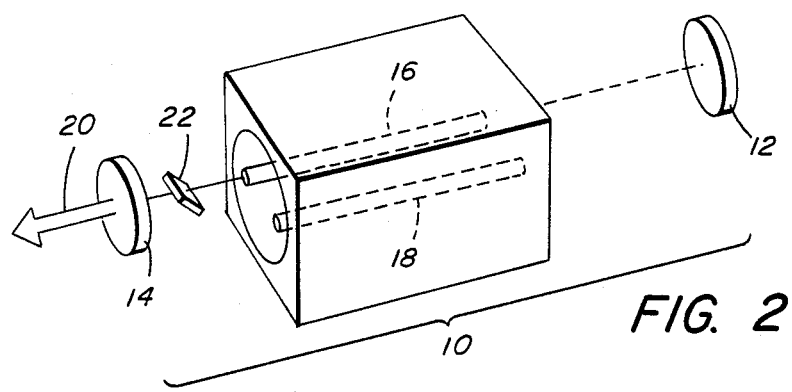
FIG. 2 is a schematic illustration of the crystal in an optical cavity.

FIG. 2 is a schematic illustration of the incorporation of the $SrAlF_5:Cr^{3+}$ crystal in an optical cavity including an optical pump. In FIG. 2, an optical cavity or laser resonator 10 is created by a high reflectivity mirror 12 and a partially reflecting mirror 14. A crystal of $SrAlF_5:Cr^{3+}$ indicated at 16 is pumped by a xenon flash lamp 18 which generates high intensity incoherent light consistent with a high temperature black body radiator. Suitable pump lamps are those that emit strongly in the wavelength region in which the $SrAlF_5:Cr^{3+}$ crystal absorbs. Such a wavelength region is 400 nm–700 nm. In addition to xenon, other suitable lamps include gaseous discharge lamps filled with krypton and designed to operate either in a continuous wave or a pulsed mode. Metallic vapor sources such as mercury, sodium, cesium, rubidium, and/or potassium are also suitable pumping lamps. The pump lamp 18 will cause a stimulated emission of coherent radiation from the optical cavity 10 represented by an arrow 20. As stated above in conjunction with FIG. 1, the coherent radiation has an emission spectrum centered around approximately 850 nm. The emitted radiation is tunable by a tuning element 22 whose orientation determines the wavelength of the radiation 20.

Figure 3:
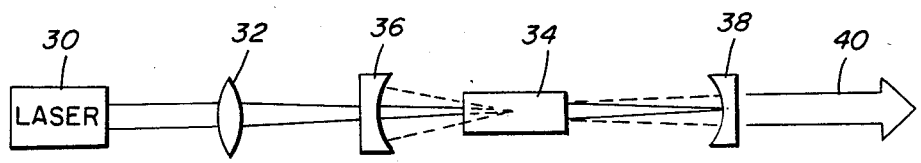
FIG. 3 is a schematic illustration of pumping with coherent radiation.

The crystal 16 may alternatively be pumped with coherent light, either pulsed or cw, such as from krypton ion and argon ion lasers. Pumping with coherent light is shown in FIG. 3. Coherent light from a laser 30 is focused by a lens 32 on a laser crystal 34 after passing through an optical element 36. The element 36 is highly transmissive to light from the laser 30, that is, light generally in the range of 400 nm–700 nm. Furthermore, the optical element 36 is highly reflective of light in the range of 750 nm–1000 nm which is the range in which the strontium aluminum fluoride crystal strongly emits radiation. An output coupling mirror 38 completes the laser resonator and output coherent radiation is indicated by an arrow 40.

It is thus seen that the objects of this invention have been achieved in that there has been disclosed a laser including as its active medium a crystal of $SrAlF_5:Cr^{3+}$. When incorporated in an optical cavity and suitably pumped, the resulting laser has an emission spectrum centered around 850 nm. This laser is tunable and has important applications in spectroscopic research.

What is claimed is:
1. A laser comprising
   a resonant cavity having a means for outputting coherent radiation and a laser medium comprising a crystal of $SrAlF_5:Cr^{3+}$, and pump means for exciting the laser medium.
2. The laser of claim 1 in which the $Cr^{3+}$ concentration is in the range between 0.5% and 10% with respect to aluminum sites.
3. The laser of claim 1 in which the pump means comprises a pulsed incoherent light source emitting at wavelengths shorter than about 700 nm.
4. The laser of claim 1 in which the pump means comprises a continuous incoherent light source emitting at wavelengths shorter than about 700 nm.
5. The laser of claim 1 in which the pump means comprises a pulsed coherent light source emitting at wavelengths shorter than about 700 nm.
6. The laser of claim 1 in which the pump source comprises a continuous coherent light source emitting at wavelengths shorter than about 700 nm.
7. In a laser, a laser medium comprising a crystal of $SrAlF_5:Cr^{3+}$ grown by the Czochralski method.

* * * * *